(12) United States Patent
Breland et al.

(10) Patent No.: US 6,254,395 B1
(45) Date of Patent: Jul. 3, 2001

(54) SYSTEM AND METHOD FOR AUTOMATED TESTING OF WRITING SKILL

(75) Inventors: Hunter M. Breland, Pennington; Probal Tahbildar, Kendall Park, both of NJ (US)

(73) Assignee: Educational Testing Service, Princeton, NJ (US)

( * ) Notice: Subject to any disclaimer, the term of this patent is extended or adjusted under 35 U.S.C. 154(b) by 0 days.

(21) Appl. No.: 09/290,900

(22) Filed: Apr. 12, 1999

Related U.S. Application Data

(60) Provisional application No. 60/081,490, filed on Apr. 13, 1998.

(51) Int. Cl.$^7$ .................................................. G09B 19/00
(52) U.S. Cl. ........................ 434/156; 434/362; 434/350; 434/322; 434/323
(58) Field of Search .................................. 434/156, 362, 434/350, 322, 323

(56) References Cited

U.S. PATENT DOCUMENTS

| | | | |
|---|---|---|---|
| 5,259,766 | * 11/1993 | Sack et al. ........................ | 434/362 X |
| 5,810,599 | * 9/1998 | Bishop .............................. | 434/157 X |
| 5,897,646 | * 4/1999 | Suda et al. ........................ | 707/530 X |
| 5,987,302 | * 11/1999 | Driscoll et al. .................. | 434/353 X |
| 6,077,085 | * 6/2000 | Parry et al. ....................... | 434/322 X |

* cited by examiner

Primary Examiner—Jessica J. Harrison
Assistant Examiner—Chandra Harris
(74) Attorney, Agent, or Firm—Woodcock Washburn Kurtz Mackiewicz & Norris LLP

(57) ABSTRACT

A system and method for administering a composition problem in a language, such as English, to an examinee. The examinee is provided with textual items such as brief essays needing correction. The examinee selects a predetermined segment of the text and moves it to an editing window where the examinee may change the segment using standard word processing techniques. The segment may be deleted or modified and then replaced in the text. The examinee continues this process by selecting other predetermined text segments. When the examinee has finished selecting and editing all the segments that the examinee wishes to change, the examinee continues to the next textual item by, for example, pressing a "next" indicator. When all the textual items have been edited, scoring is performed by comparing the examinee's solutions to acceptable solutions stored in a database.

30 Claims, 5 Drawing Sheets

SYSTEM AND METHOD FOR AUTOMATED TESTING OF WRITING SKILL

RELATED APPLICATIONS

This application claims the benefit of U.S. Provisional Application No. 60/081,490, filed Apr. 13, 1998.

FIELD OF THE INVENTION

The present invention relates in general to computer based testing. More particularly, the present invention relates to the standardized testing of the writing skill of an examinee using computer based testing techniques.

BACKGROUND OF THE INVENTION

In the standardized testing field, large-scale standardized testing has long depended upon the administration of multiple-choice tests by using paper-and-pencil, which can be scored efficiently and objectively by modern scanning technology. The recent availability of a computer based testing system has substantially automated the entire process of standardized testing. A central processing facility provides the software development to support the computer based testing system and post processing activities. A test program may be developed, produced, and packaged at the central processing facility. The computer based test is then transferred to one or more test centers. Each test center has at least one computer workstation on which the computer based test can be delivered to an examinee. After an examinee has taken the test, the examinee responses and other information recorded during the testing session may be transferred to the central processing facility for post processing, i.e., for scoring and statistical and analytical studies used in the development of new tests, or they may be scored at the test center. However, such standardized tests have the disadvantage that they depend on multiple choice type problems that may not adequately represent the tasks which examinees may encounter in academic and work settings or may not adequately test the skills sought to be assessed.

In the testing of English composition skills, large-scale standardized testing has depended on both multiple choice and "free-response" items. A free-response writing examination is one in which the examinee provides a written response to an open-ended question, which is then graded individually by humans. The grading is expensive because each response is typically scored by at least two people, usually experienced English teachers. Moreover, multiple choice questions used to test composition skills employ individual sentences and brief paragraphs. This technique has been considered inadequate by some English teaching professionals because it is an "indirect" approach to writing skill assessment.

Accordingly, there is a need to provide a computer based system that assesses writing skill without the use of human graders or multiple-choice questions. The system must be able to administer the test and automatically evaluate and score the examinee's responses. The present invention has been designed to meet these needs in the art.

SUMMARY OF THE INVENTION

The present invention meets the above-mentioned needs in the art by providing a method of computer based testing on a computer comprising the steps of providing a textual item having at least one predetermined textual segment to an examinee, receiving an instruction from the examinee to select one of the predetermined textual segments, providing the selected textual segment to the examinee for editing, receiving an edited textual segment from the examinee, and comparing the edited textual segment to a set of solutions.

According to one aspect of the present invention, the step of providing the textual item to the examinee comprises providing the textual item in a first window on a display screen of the computer. Preferably, the step of providing the selected textual segment to the examinee for editing comprises providing the selected textual segment in an editing window on the display screen.

According to a further aspect of the present invention, a step of parsing the edited textual segment from the examinee is provided after the step of receiving the edited textual segment.

According to further aspects of the present invention, the method further comprises the step of selecting the textual item from a set of textual items prior to the step of providing the textual item to the examinee. Preferably, the step of selecting the textual item is responsive to an item-selection algorithm where each textual segment comprises no error or at least an error in grammar, punctuation, syntax, sentence structure, vocabulary, idiom, and word choice.

According to further aspects of the present invention, a step of determining the set of solutions using natural language processing is provided. Preferably, the step of encrypting the set of solutions is also provided.

In the preferred embodiment of the present invention, a score is determined responsive to the step of comparing. Preferably, the score is determined using a scoring algorithm.

According to further aspects of the present invention, another textual item is selected responsive to an instruction from the examinee, and the selected textual segment is displayed responsive to an instruction from the examinee. Preferably, the selected textual segment can be provided to the examinee for editing after receiving the edited textual segment from the examinee. Moreover, a set of instructions is preferably provided to the examinee in an instruction window on the display screen. Preferably, the set of instructions is capable of being provided responsive to an instruction from the examinee.

According to one aspect of the present invention, the edited textual segment is replaced in the textual item for the selected textual segment prior to the step of comparing the edited textual segment to the set of solutions.

In a further embodiment within the scope of the present invention, a computer based testing system is provided comprising a first memory comprising a plurality of textual items each having at least one predetermined textual segment; a controller for selecting one of the textual items from the first memory; a display for displaying the selected textual item; a selection device for allowing an examinee to select one of the predetermined textual segments for editing, the selected textual segment being displayed on the display; an editor for allowing the examinee to edit the selected textual segment; and a comparator for comparing the edited textual segment to a set of solutions.

In a further embodiment within the scope of the present invention, a method of computer based testing is provided comprising the steps of producing a computerized test having a plurality of textual items having predetermined segments of text to be selected and edited by an examinee, at least one related test screen containing messages and directions comprising information for the examinee, and an item-selection algorithm defining rules for determining a sequence of the textual items to be presented; delivering the computerized test to the examinee by presenting the textual items and related test screen to the examinee at a computer workstation according to rules defined by the item-selection algorithm; recording responses provided by the examinee to the predetermined segments of text in the textual items presented; selecting and parsing the responses to remove extraneous information; and comparing the parsed responses with a set of solutions stored in a knowledge base to generate a score using a scoring algorithm.

In a further embodiment within the scope of the present invention, a computer based testing system is provided comprising a test development system for creating a computerized test having a plurality of textual items having predetermined segments of text to be selected and edited by an examinee and at least one related test screen containing messages and directions comprising information for the examinee; a workstation operable to deliver the computerized test to the examinee by presenting the textual items and related test screen to the examinee, the workstation operable to record responses provided by the examinee to the predetermined segments of text in the textual items presented; means for selecting the responses and parsing the responses to remove extraneous information; a knowledge base comprising solutions; and means for comparing the parsed responses with the solutions stored in the knowledge base to generate a score in accordance with a scoring algorithm.

BRIEF DESCRIPTION OF THE DRAWINGS

The foregoing and other aspects of the present invention will become apparent from the following detailed description of the invention when considered in conjunction with the accompanying drawings, of which.

DETAILED DESCRIPTION OF EXEMPLARY EMBODIMENTS

The present invention is directed to a computer based system and method for administering a composition problem in a language, such as English, to an examinee. The examinee is provided with one or more textual items consisting of brief essays needing improvement or correction. The examinee selects a predetermined segment of one of the textual items and moves it to an editing window. In the editing window, the examinee may edit the segment using standard word processing techniques. The segment may be deleted or edited and then replaced in the textual item. The examinee continues this process by selecting and editing other predetermined segments of the textual item. When the examinee has completed selected and editing all the segments in the textual item that he or she wishes to change, the examinee continues to another textual item by, for example, pressing a "next" indicator. When all the textual items have been edited, scoring is performed by comparing the examinee's solutions to acceptable solutions stored in a memory or database.

Figure 1:
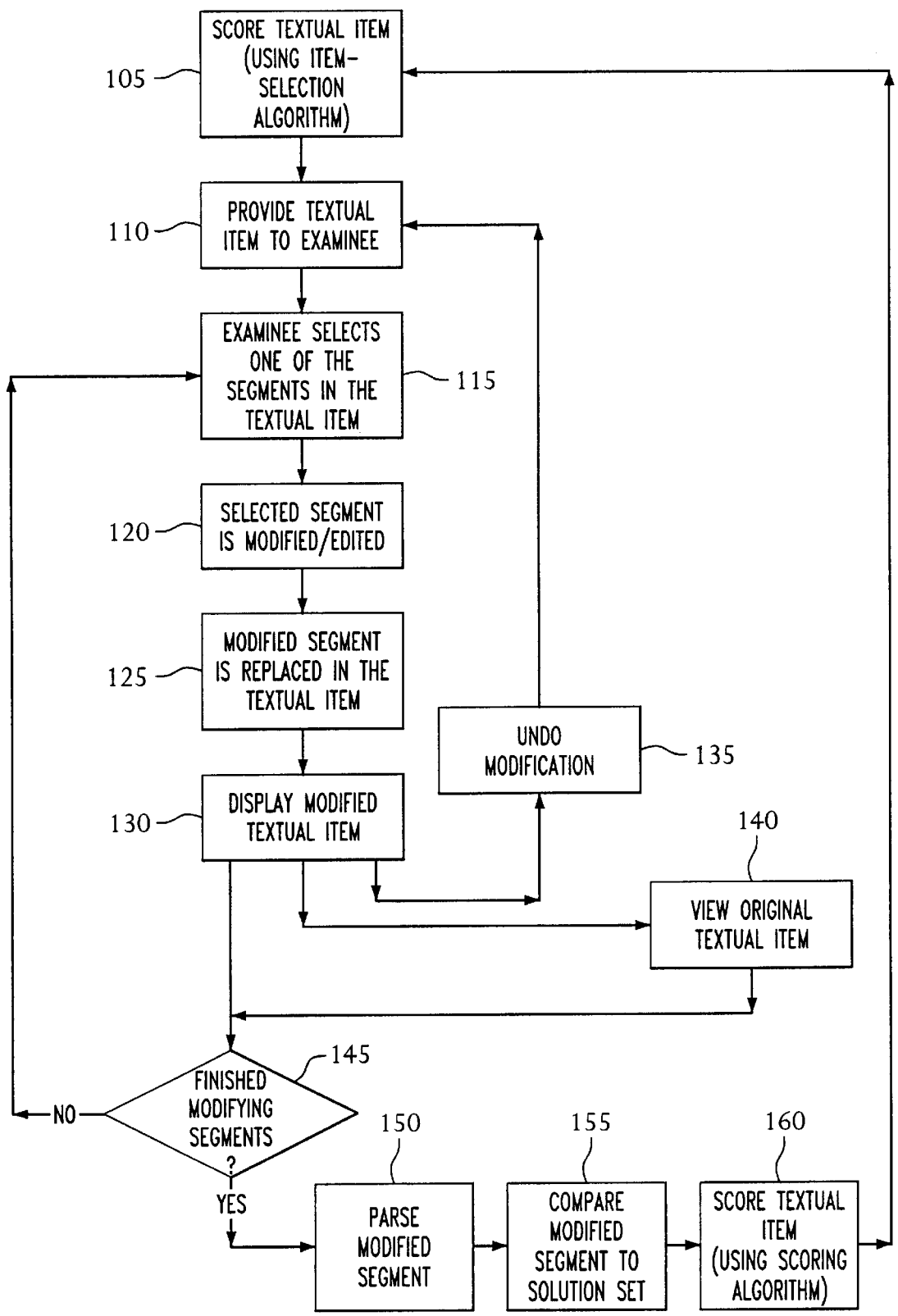
FIG. 1 is a flow diagram of an exemplary test delivery and scoring method in accordance with the present invention.
Figure 4:
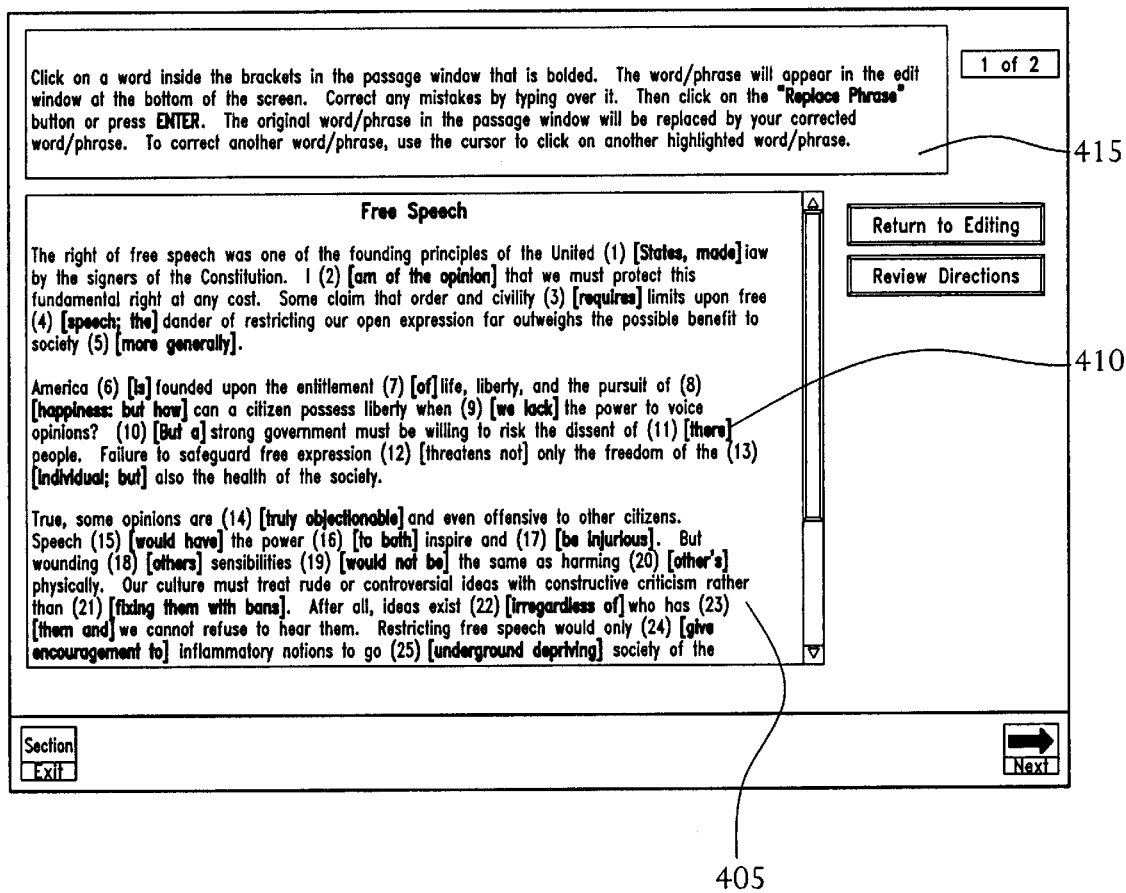
FIG. 4 shows a screen print of an exemplary textual essay passage of a test with instructions to the examinee in accordance with the present invention.

One exemplary embodiment of the exemplary test delivery and scoring method in accordance with the present invention is shown in FIG. 1. The examinee is presented with text (e.g., an original essay) that is being tested. As illustrated, a textual item is selected at step 105. The textual item (as shown in FIG. 4, for example, as element 405) is selected from an item pool (stored in a memory, for example, or a database) using item-selection algorithms. Any of several conventional item-selection algorithms can be used, including algorithms that adapt predetermined difficulty levels to student ability, linear algorithms, and random sample algorithms. The textual item consists of a passage with a number of predetermined segments (elements 410, for example, in FIG. 4). These segments contain errors in grammar, punctuation, syntax, sentence structure, vocabulary, idiom, or word choice, for example, or may contain no errors at all. At step 110, the textual item is presented to the examinee in a window on the computer. Preferably, the examinee is also presented with a short set of instructions that appear on another window at the top of the screen (e.g., element 415 in FIG. 4).

At step 115, the examinee selects any of the predetermined segments he or she wishes to modify by clicking on the segment with a mouse, for example, although other selection devices can be used such as a keyboard, a lightpen, a stylus, and a pushbutton. Preferably, the selected segment is moved to a smaller window at the bottom of the screen known as the "edit window" (e.g., element 505 in FIG. 5) where the examinee may make any desired modifications or edits, at step 120. Modifications are preferably made by using a standard set of editing features such as typing over, the cut, copy, and paste features, or the use of the delete or backspace keys.

When the examinee has completed making modifications, he or she can click on a "replace phrase" button (element 510 in FIG. 5) or other similar element which replaces the original segment in the textual item with the modified segment, at step 125. This modified segment then becomes part of the passage and is tagged as having been modified for later scoring. After the segment is replaced, the modified text or essay is presented to the examinee at step 130.

At this point, the examinee can "undo" the changes he or she made to the textual item at step 135, and begin modifications anew with processing continuing at step 110. Thus, the examinee can, at any time as shown by step 135, revert back to the original passage and discard the modifications he or she may have had made to the passage. This can be done by clicking on a "revert to original passage" or "start over" button or other similar element.

The examinee also has the option of viewing the original textual item without destroying or undoing his modifications, at step 140. Thus, the examinee, at any time as shown by step 140, may click on a "view original passage" or "view original essay" button or other similar element to view the original item passage without the modifications made by the examinee.

Processing continues at step 145 where it is determined if the examinee has finished modifying all of the segments in the textual item. If not, processing continues at step 115 in which the examinee selects another segment for modification and replacement. It should be noted that if the examinee wishes, he or she can re-select a segment for further modification. The examinee can also select to not make any modifications to a segment (if, for example, the examinee believes there is no error in the segment). When the examinee is finished making modifications to all of the segments, he or she can click on a "next" button to continue (e.g., element 515 in FIG. 5). If the examinee has finished modifying the segments, the segments are optionally parsed at step 150, using conventional parsing technologies and compared to a set of solutions at step 155.

Figure 3:
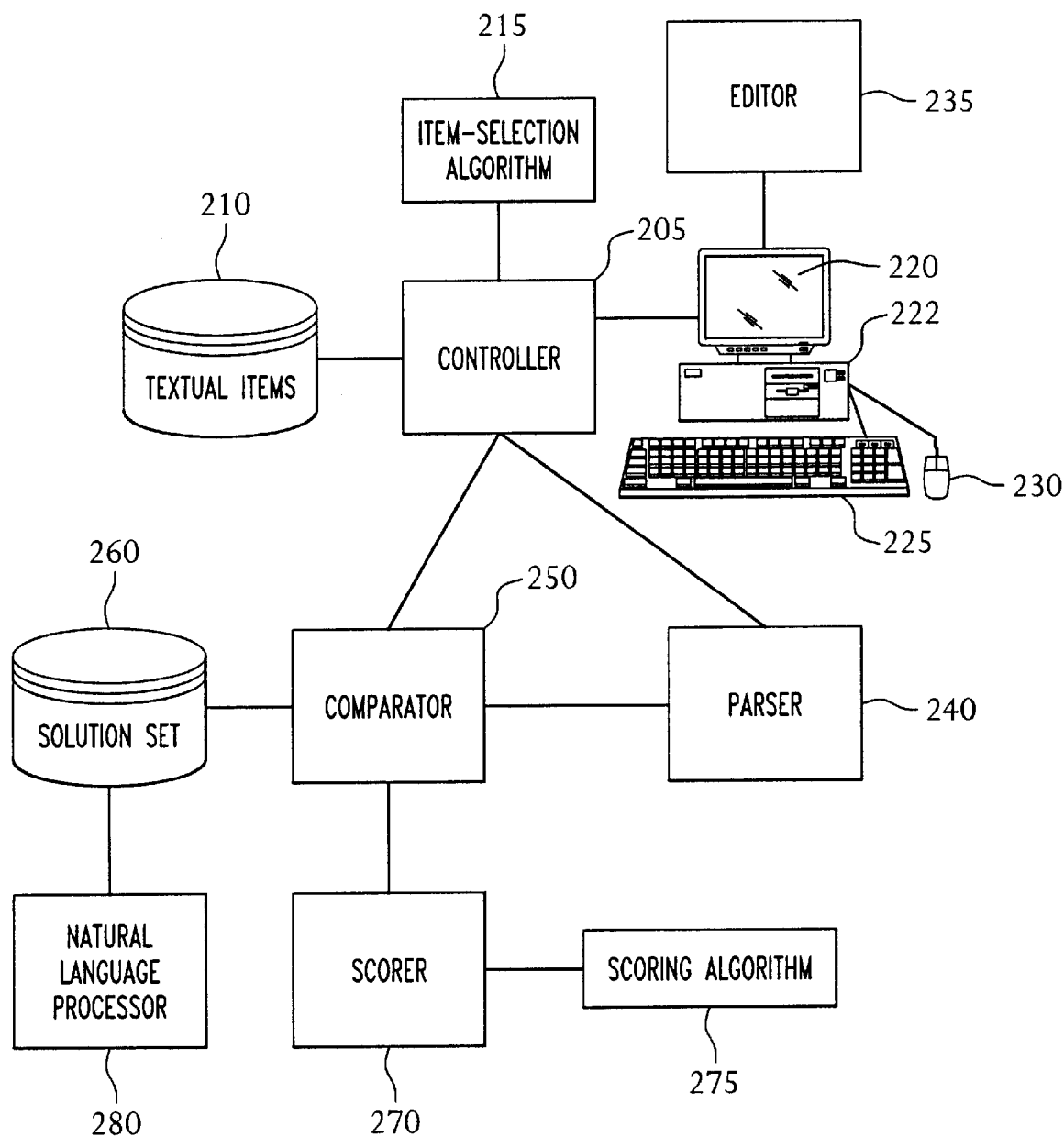
FIG. 3 is a functional block diagram of an exemplary testing system in accordance with the present invention.

The present invention comprises a knowledge database or memory (element 260 in FIG. 3). The knowledge base is a repository of correct and incorrect responses to the textual problems provided to the examinee, although some of the text segments identified preferably contain no compositional errors or problems at all and thus should not be changed by the examinee. In tests of English composition, for example, the correct and incorrect responses are preferably developed by experts in the field of English composition, who review and modify the solutions as experience is obtained through test administrations. The knowledge base preferably includes solutions developed automatically though natural language processing, using conventional language processing techniques. Preferably, the natural language processing solutions are to be used for situations where no pattern matches occur even though the solution may be correct.

At step 160, a score is determined based on the results of the comparison and a scoring algorithm. Scoring is accomplished by comparing solutions provided by the examinee with solutions in the knowledge base preferably provided by experts in the field of English composition. The correct solutions are stored in the knowledge base preferably in an encrypted manner, using conventional encryption technologies. As described above, at step 150, an examinee's solutions are parsed to remove any extraneous information such as extra spaces or punctuation. The parsed segment is then matched against solutions stored in the knowledge base. The knowledge base may contain one or more possible solutions. If a match is found, the segment is scored as correct. The scoring algorithm also recognizes some solutions as better than others, as indicated by experts in the field of English composition. Scoring also makes use of natural language processing techniques to allow for solutions not stored in the knowledge base repository.

Figure 2:
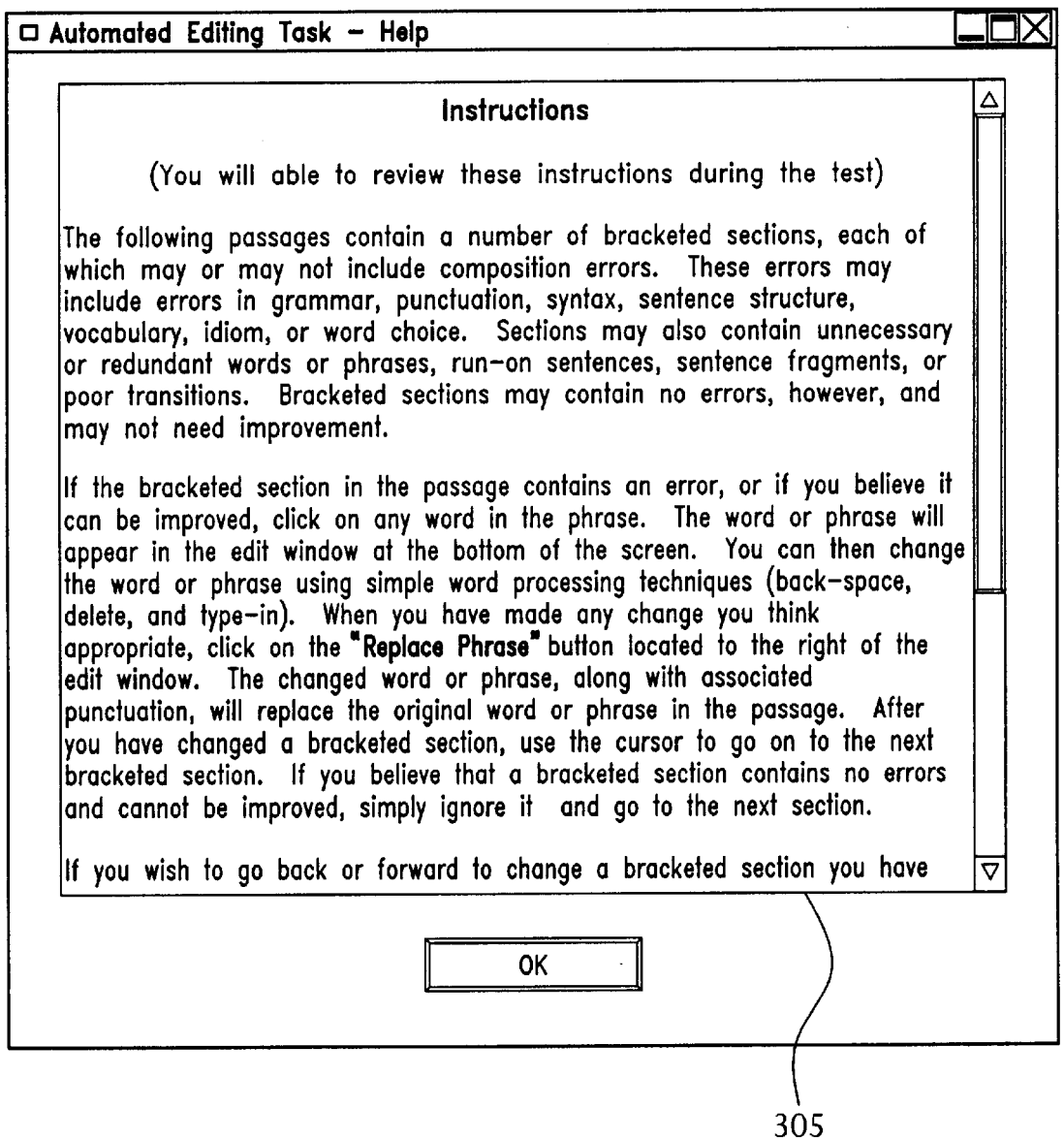
FIG. 2 shows a screen print of an exemplary set of instructions for use in the present invention.

It should be noted that at any time, the examinee may click on a "view instructions" button or other similar element to view a detailed set of instructions on how to complete the task. FIG. 2 shows a screen print of an exemplary set of instructions 305 for use in accordance with the present invention.

A block diagram of an exemplary testing system is shown in FIG. 3. A memory or database 210 holds the textual items that each have the predetermined textual segments. Initially, at start-up, a controller 205 selects the textual items from the memory 210 in accordance with an item-selection algorithm 215. The textual item is displayed on a display 220, which can be a computer screen at a computer workstation 222. A selector, such as a keyboard 225 or a mouse 230, is used by the examinee to select a segment of the textual item on the display 220 for editing. An editor 235, preferably disposed within the workstation 222, is used by the examinee to edit the selected segment.

A parser 240 parses the modified segment for any extraneous information. In other words, extra spaces between words or punctuation are deleted. The modified segment, parsed, is provided to a comparator 250. The comparator 250 compares the modified segment to a solution set stored in a memory or database 260. There may be one or more possible solutions to an item and the examinee's response is compared against all of the possible solutions. If a match is found, the segment is initially scored as "correct."

A scorer 270 then determines a final score based on the comparison and a scoring algorithm 275. The scoring algorithm allows for complete or partial matching with pre-programmed solutions or solutions derived from existing natural language processors. The scoring algorithm also allows for variable credit depending on the predetermined quality of the solution. Scoring is automated and the scoring procedures can be invoked either at the end of each textual item, as shown by step 160, or at the end of one segment, or the entire test, as desired. A score message can then be generated for storage and/or display. Scoring is accomplished through the comparison of a examinee's responses against a knowledge base containing correct solutions to the items. The answer keys are preferably encrypted and stored in an external file or memory 260. When the scoring procedure is invoked, the segments that have been modified are first extracted from the passage. Each segment is preferably treated and scored independently of the other segments. The solution set can optionally be determined by a natural language processor 280.

Figure 5:
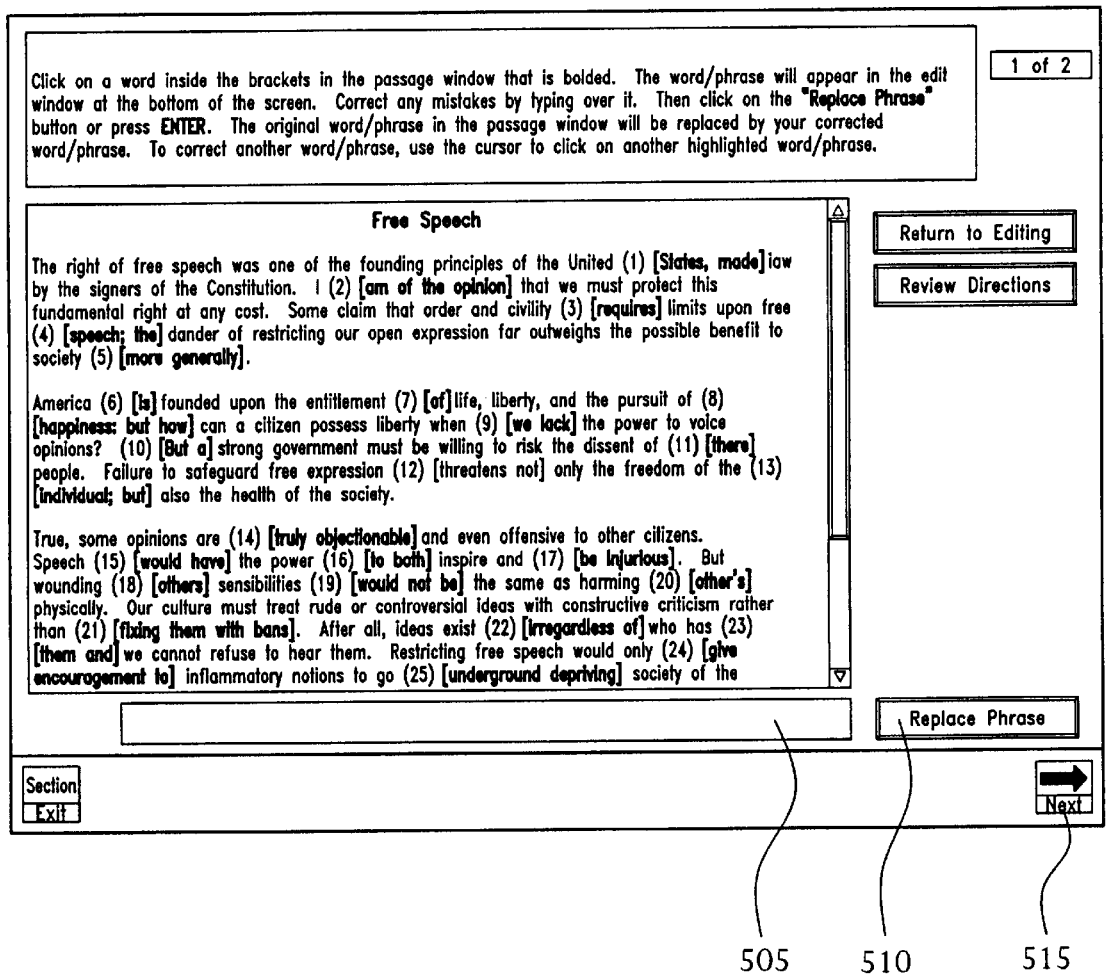
FIG. 5 shows the screen print of FIG. 4 with an edit window, a "replace phrase" selector, and a "next" selector.

FIG. 4 shows a screen print of an exemplary textual item of a test essay passage with instructions to the examinee. The textual item 405 contains bolded phrases or predetermined segments 410 that are highlighted to be selected and modified by an examinee. The window 415 provides instructions to the examinee. FIG. 5 shows the screen print of FIG. 4 with an edit window 505, a "replace phrase" selector 510, and a "next" selector 515. As noted above, during an examination, the examinee moves a portion of the text into the edit window 505, edits the text using conventional word processing techniques, and returns the revised text.

Although illustrated and described herein with reference to certain specific embodiments, the present invention is nevertheless not intended to be limited to the details shown. Rather, various modifications may be made in the details within the scope and range of equivalents of the claims without departing from the invention.

What is claimed:

1. A method of computer based testing on a computer, comprising the steps of:

providing to an examinee a textual item having at least one predetermined textual segment;

receiving an instruction from the examinee to select one of the at least one predetermined textual segments;

providing to the examinee the selected textual segment for editing;

receiving from the examinee an edited textual segment, and comparing the edited textual segment to a set of solutions.

2. The method according to claim 1, wherein the step of providing the textual item to the examinee comprises providing the textual item in a first window on a display screen of the computer.

3. The method according to claim 2, wherein the step of providing the selected textual segment to the examinee for editing comprises providing the selected textual segment in an editing window on the display screen.

4. The method according to claim 1, further comprising the step of parsing the edited textual segment from the examinee after the step of receiving the edited textual segment.

5. The method according to claim 1, further comprising the step of selecting the textual item from a set of textual items prior to the step of providing the textual item to the examinee.

6. The method according to claim 5, wherein the step of selecting the textual item is responsive to an item-selection algorithm.

7. The method according to claim 1, wherein each textual segment comprises no error or at least one of an error in grammar, punctuation, syntax, sentence structure, vocabulary, idiom, and word choice.

8. The method according to claim 1, further comprising the step of determining the set of solutions using natural language processing.

9. The method according to claim 8, further comprising the step of encrypting the set of solutions.

10. The method according to claim 1, further comprising the step of determining a score responsive to the step of comparing.

11. The method according to claim 1, further comprising the step of displaying the selected textual segment responsive to an instruction from the examinee.

12. The method according to claim 1, further comprising the step of providing the selected textual segment to the examinee for editing, after receiving the edited textual segment from the examinee.

13. The method according to claim 1, further comprising the step of providing a set of instructions to the examinee in an instruction window on the display screen.

14. The method according to claim 13, wherein the step of providing the set of instructions is activated responsive to an instruction from the examinee.

15. The method according to claim 1, further comprising the step of replacing the edited textual segment in the textual item for the selected textual segment prior to the step of comparing the edited textual segment to the set of solutions.

16. A computer based testing system comprising:
   a first memory comprising a plurality of textual items each having at least one predetermined textual segment;
   a controller for selecting one of the textual items from the first memory;
   a display for displaying the selected textual item;
   a selection device for allowing an examinee to select one of the at least one predetermined textual segments for editing, the selected textual segment being displayed on the display;
   an editor for allowing the examinee to edit the selected textual segment; and
   a comparator for comparing the edited textual segment to a set of solutions.

17. The system according to claim 16, wherein the selected textual item is displayed in a first window on the display, and the selected textual segment is displayed in a second window on the display.

18. The system according to claim 16, further comprising a parser for parsing the edited textual segment prior to providing the edited textual segment to the comparator.

19. The system according to claim 16, further comprising an item-selection algorithm that the controller uses to select one of the textual items from the first memory.

20. The system according to claim 16, wherein each textual segment comprises no error or at least one of an error in grammar, punctuation, syntax, sentence structure, vocabulary, idiom, and word choice.

21. The system according to claim 16, her comprising a natural language processor to determine the set of solutions.

22. The system according to claim 16, further comprising an encrypter which encrypts the set of solutions.

23. The system according to claim 16, further comprising a scorer for determining a score responsive to an output of the comparator.

24. The system according to claim 23, further comprising a scoring algorithm, wherein the scorer determines the score using the scoring algorithm.

25. The system according to claim 16, wherein the display presents a set of instructions to the scorer.

26. The system according to claim 16, wherein the selection device is one of a keyboard, a mouse, a lightpen, a stylus, and a pushbutton.

27. A method of computer based testing, comprising the steps of:
   producing a computerized test having a plurality of textual items having predetermined segments of text to be selected and edited by an examinee, at least one related test screen containing messages and directions comprising information for the examinee, and an item-selection algorithm defining rules for determining a sequence of the textual items to be presented;
   delivering said computerized test to the examinee by presenting said plurality of textual items and related test screen to the examinee according to rules defined by item-selection algorithm;
   recording responses provided by the examinee to the predetermined segments of text in the textual items presented;
   selecting and parsing said responses to remove extraneous information; and
   comparing said parsed responses with a plurality of solutions stored in a knowledge base to generate a score in accordance with a scoring algorithm.

28. The method according to claim 27, wherein at least one of said plurality of solutions is determined in response to natural language processing.

29. A computer based testing system comprising:
   a test development system for creating a computerized test having a plurality of textual items having predetermined segments of text to be selected and edited by an examinee and at least one related test screen containing messages and directions comprising information for the examinee;
   a workstation operable to deliver said computerized test to the examinee by presenting said plurality of textual items and related test screen to the examinee, said workstation operable to record responses provided by the examinee to the predetermined segments of text in the textual items presented;
   means for selecting said responses and parsing said responses to remove extraneous information;
   a knowledge base comprising a plurality of solutions; and
   means for comparing said parsed responses with said plurality of solutions stored in said knowledge base to generate a score in accordance with a scoring algorithm.

30. The system according to claim 29, further comprising a natural language processor for determining at least one of said plurality of solutions.

* * * * *